(12) United States Patent
Barnett

(10) Patent No.: US 6,510,948 B1
(45) Date of Patent: Jan. 28, 2003

(54) MULTIPLE RADIAL ARM ETCHED DISC FILTER ELEMENT

(75) Inventor: John M. Barnett, Covina, CA (US)

(73) Assignee: Vacco Industries, Inc., South El Monte, CA (US)

( * ) Notice: Subject to any disclaimer, the term of this patent is extended or adjusted under 35 U.S.C. 154(b) by 0 days.

(21) Appl. No.: 09/616,856

(22) Filed: Jul. 14, 2000

(51) Int. Cl.⁷ .................................. B01D 25/00
(52) U.S. Cl. .................. 210/446; 210/488; 210/498
(58) Field of Search ...................... 210/488, 446, 210/498, 443, 456, 483, 492

(56) References Cited

U.S. PATENT DOCUMENTS 4,410,430 A * 10/1983 Hagler, Jr. ................. 210/446
4,631,126 A   12/1986 Keith et al.
4,726,900 A    2/1988 Keskinen et al.
5,711,877 A    1/1998 Gonzalez
5,935,424 A    8/1999 Dyer et al.

* cited by examiner

Primary Examiner—Robert J. Popovics
(74) Attorney, Agent, or Firm—Pillsbury Winthrop LLP

(57) ABSTRACT

The present invention relates to etched disc stack filters and particularly to such filters in which the etched discs include multiple arms in which are etched flow channels for the passage of a medium to be filtered and the removal or separation of a contaminant. In a particular embodiment of the invention, the etched discs may have an overall shape that is circular and may have filtering arms which radially extend from the center of each disc to the exterior border of the disc. The filtering arms may separate inlet and outlet openings. End caps may be attached at the ends of the disc stack and these end caps may have openings corresponding to the inlet and outlet openings in the discs in the disc stack.

28 Claims, 3 Drawing Sheets

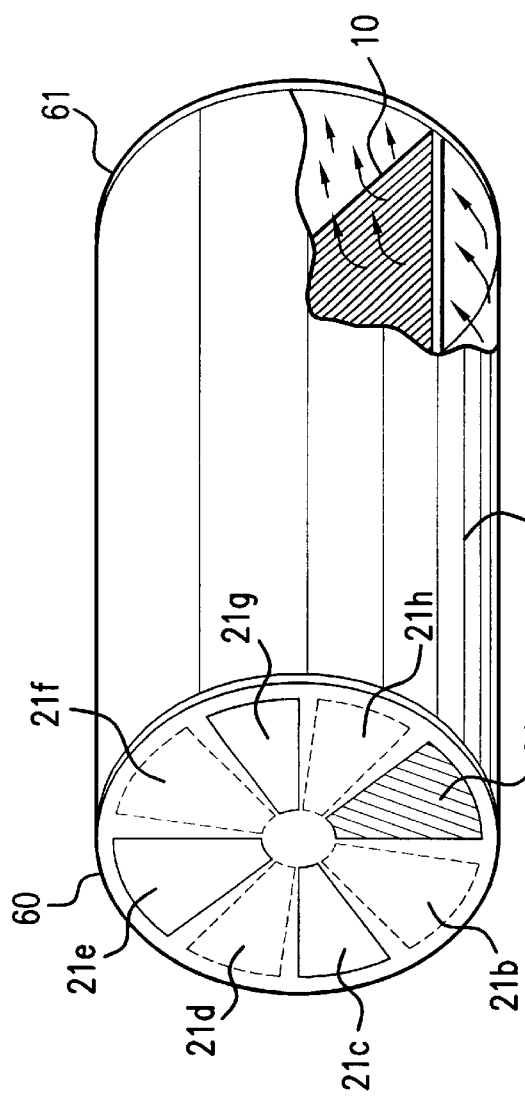
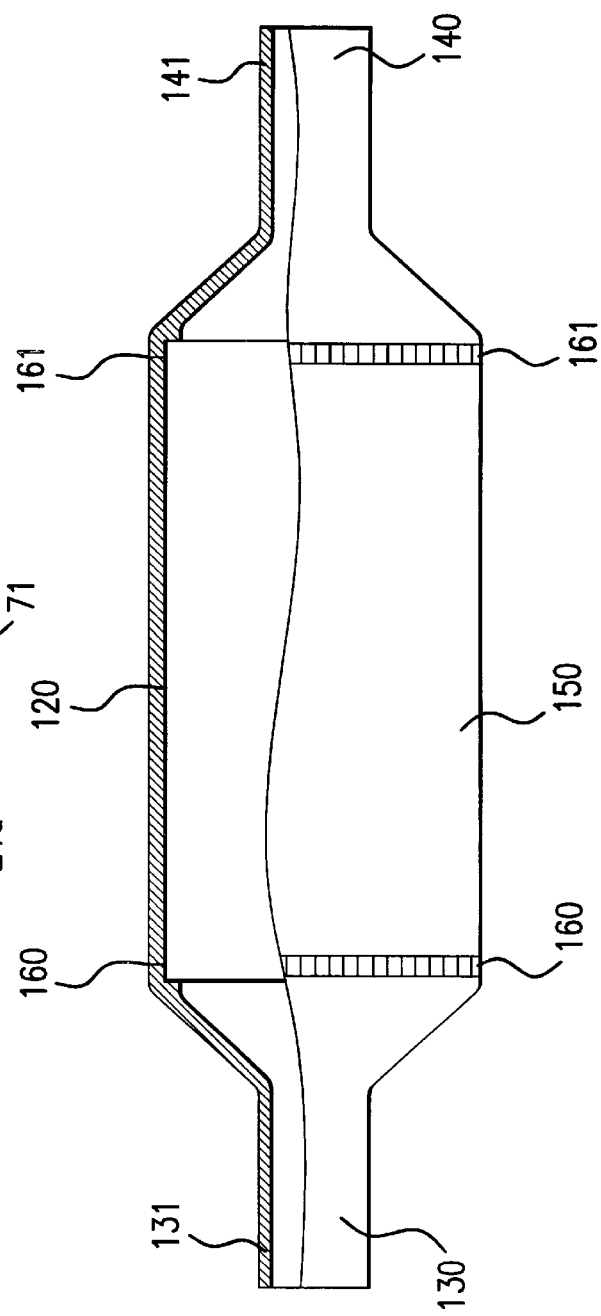

MULTIPLE RADIAL ARM ETCHED DISC FILTER ELEMENT

BACKGROUND

The present invention relates to filters, and more particularly to etched disc stack filter elements and filter assemblies including such filter elements.

In order to remove solid particles from a flowing gas or liquid, wire mesh or sintered filters have heretofore been used, particularly for the separation of particles smaller than 100 microns. Such filters may have certain advantages when compared to an etched disc filter element comprised of a stack of filter discs. In a wire mesh screen, for example, each flow passage through the screen is very short thus minimizing pressure drop through the filter. Additionally, wire mesh screen may be advantageous in maximizing the ratio of open or pore area relative to the solid area of the filter mesh and thus provide a greater filter capacity per unit weight of the structure. However, wire mesh and sintered filters inherently have certain disadvantages. For example, it is virtually impossible to attain uniform size of pores or interstices in a wire mesh or sintered filter; the filters have an inherently low resistance to high pressure differentials; and the filter elements cannot be satisfactorily back-flushed for cleaning and re-use.

Stacked sheet filters, such as that disclosed in U.S. Pat. No. 3,648,843 to Pearson, overcome many of the disadvantages of wire mesh and sintered filters. However, as compared to wire mesh and sintered filters, stacked sheet filters typically have relatively long flow passages therethrough and, accordingly, induce a relatively high pressure drop. Further, stacked sheet filters have a relatively low ratio of open space to closed space as compared to wire mesh and sintered filters.

Current etched disc filter elements utilize a multitude of individual discs with a round or modified round configuration stacked one on top of the other. The basic flow path of media in these existing systems is from the outside diameter of a disc to the interior region of a disc. Therefore, the diameter of the discs and/or the overall length of the disc stack must be increased to produce a larger filter area. Creating a larger filter area by increasing the diameter of each disc or the overall length of the disc stack increases the size, weight, cost and complexity of the filter element. Although the direction of the flow of media is normally from the outside diameter to the interior region of the discs, there are times when a reversal of the flow direction is needed, such as to clean the filter element. Based on existing filter element architecture, this results in a decrease in the overall efficiency of the filter element since the inlet and outlet flow passages are unequal in size.

SUMMARY OF THE INVENTION

The present invention relates to a etched disc stack filter element and assembly. In embodiments of the present invention, discs in the disc stack have filtering arms on which are etched flow channels. These filtering arms separate inlet and outlet flow passages. As the medium to be filtered flows from an inlet passage to an outlet passage, contaminants too large to pass through the etched flow channels are removed or separated from the medium.

BRIEF DESCRIPTION OF THE DRAWINGS

FIG. 2 is a perspective view of a filter element provided in accordance with an embodiment of the present invention.

FIG. 3 is a cross-sectional view of an exemplary circular disc stack filter assembly provided in accordance with an embodiment of the present invention.

DETAILED DESCRIPTION

Figure 1A:
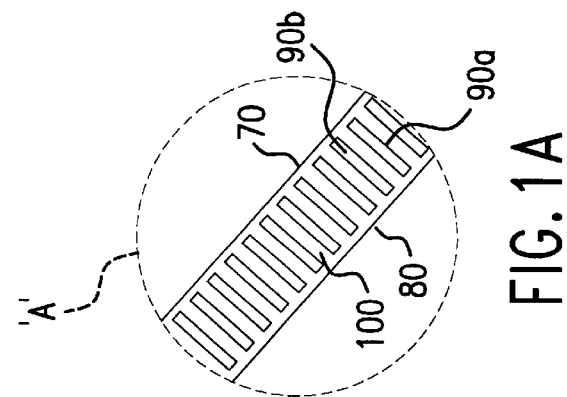
FIG. 1A is an enlarged top view of a radial arm within the etched disc shown in FIG. 1.

The multiple radial arm etched disc filter element of the present invention offers significant advantages over existing stacked disc filter elements by enabling the required filter area to be obtained with a decrease in the overall size, weight, cost and complexity of the filter element as compared to current designs. Furthermore, in particular embodiments of the invention, flow direction may be reversed without decreasing the filtration rate and extending the in-service life of the filter element.

The present invention involves a stacked disc filter element composed of discs with multiple filtering arms. The filtering arms separate inlet and outlet flow openings in each filter disc. Before constructing the filter element, the filtering arms of each disc may be chemically etched with the desired flow channels. Media that flows into the inlet flow opening of the filter element may be drawn across the multiple filtering arms through these flow channels to an outlet flow opening. Based on the size and design of the channels, the filtration rating and the dirt capacity of the filter may be varied. The present invention may significantly increase the filtering area per disc as compared to traditional disc stack filter designs. This increase in filtering area may be accomplished without significantly increasing the overall area of the discs or length of the disc stack. Accordingly, in particular embodiments of the invention, the total increase of filtering area per disc may enable filter elements to utilize a smaller number of individual discs while maintaining the same level of filtration as compared to standard disc configurations. Using a smaller number of discs may also reduce the overall filter element weight despite a slight increase in the mass of each disc. Particular embodiments of the current invention may also be non-discriminate with regard to flow direction. Furthermore, in embodiments in which the filter area is based on equal-sized inlet and outlet flow openings formed from the removed portions within the perimeter of each disc, flow through the element assembly can be reversed without affecting the filter area or efficiency.

The present invention may also improve the overall strength and rigidity of filter elements. Existing filter elements use the outside diameter of a disc as an area to chemically etch flow paths into the interior of the disc. Because the outside diameter of current discs is used to provide flow paths, the stacking of discs may make the outside walls of the filter element more vulnerable to environmental conditions such as vibration and shock. In embodiments of the present invention, the outside diameter of the etched disc may be used solely to reinforce the outside walls of a filter element. In such embodiments, the filter element may be used in a bodiless fashion, i.e., without being encased in a tubular outer body, or as support in a filter assembly. In these embodiments of the present invention, filtering may be accomplished solely through the use of the filtering arms. Using the outside diameter of the discs only for support may greatly increase the overall strength and rigidity of the filter element.

Figure 1B:
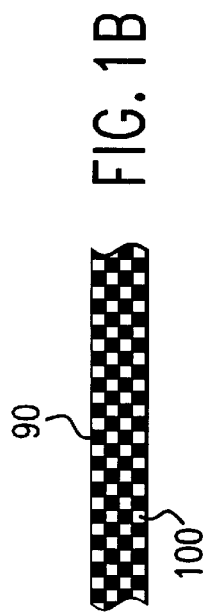
FIG. 1B shows a cross-sectional view of a disc stack composed of discs as shown in FIG. 1.
Figure 1:
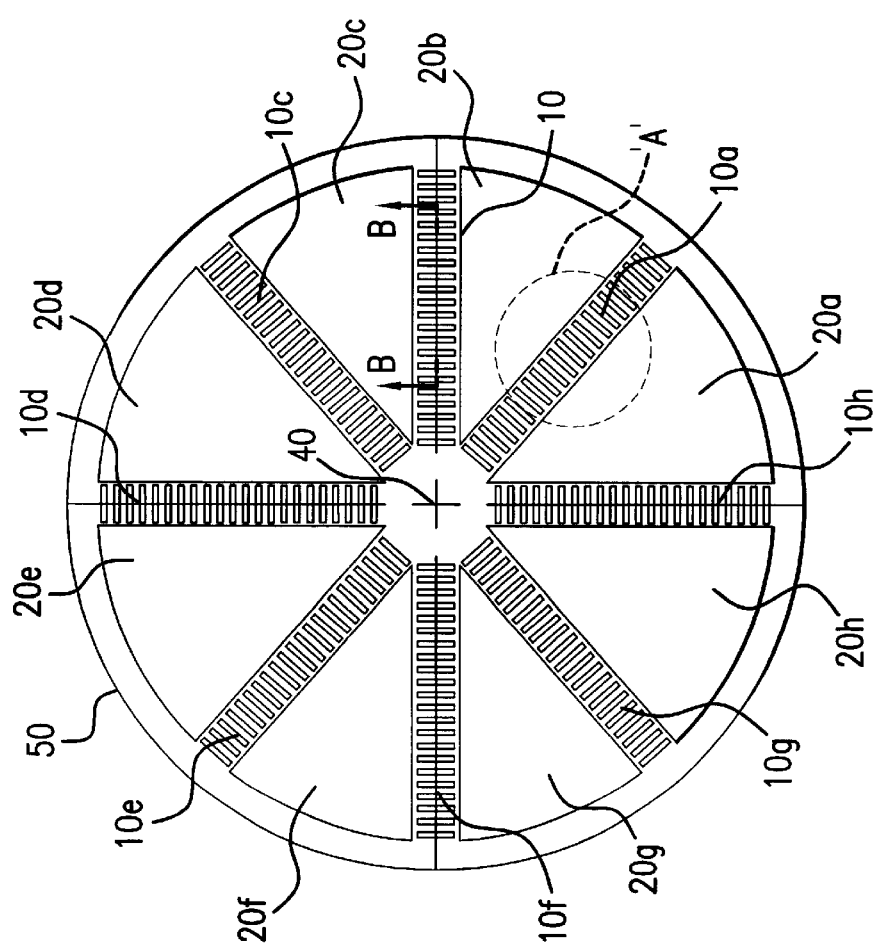
FIG. 1 is a top view of an etched disc provided in accordance with an embodiment of the present invention.

A top view of a multiple radial arm etched disc, provided in accordance with the invention, is shown in FIG. 1. In the embodiment shown, the etched disc is circular in shape and has multiple filtering arms 10a–10h, extending radially from the center 40 of the disc to points on the exterior border 50. Although the filtering arms shown in FIG. 1 extend radially, it should be understood that, in alternative embodiments of the invention, the filtering arms 10a–10h need not extend radially and the disc need not be circular in shape. Furthermore, alternative embodiments of the invention may incorporate a greater or lesser number of filtering arms.

The disc may have openings 20a–10h between filtering arms 10a–10h. When multiple discs are stacked together, the openings 20a–10h in each disc may be aligned to form flow passages. Inlet openings 20a, 20c, 20e and 20g may be associated with inlet flow while outlet openings 20b, 20d, 20f and 20h may be associated with outlet flow. A flow path for a particular disc begins at one of the inlet openings 20a, 20c, 20e and 20g, continues through the flow channels etched into the filtering arms 10a–10h and ends in one of the outlet openings 20b, 20d, 20f and 20h. The openings 20a–10h may be created by removing portions of the disc enclosed by the radial arms 10a–10h and the exterior border 50 through chemical etching, stamping or other similar procedures. Alternatively, the disc configuration of filtering arms 10a–10h and openings 20a–10h may be formed by molding. An equal number of radial arms 10a–10h may be create an equal number of openings 20a–10h.

An embodiment of the invention may have etched flow channels through the exterior border 50. However, preferably, the exterior border of the disc will not be etched with flow channels so that, when multiple discs are stacked together, their exterior borders may provide containment for the medium beings filtered and support for the filter element without the need for an encasing outer body.

FIG. 1A shows an enlarged view of portion 'A' of an etched filtering arm 10a shown in FIG. 1. As shown in FIG. 1, the filtering arm 10a separates inlet opening 20a from outlet opening 20b. The filtering arm 10a may include a collection edge 80 on the side of the filtering arm 10a adjoining the inlet opening 20a and an opposing edge 70 on the side of the filtering arm 10a adjoining the outlet opening 20b. The filtering arm 10a may include multiple bars, such as bars 90a and 90b, and flow channels, such as flow channel 100, between these bars. Contaminant particles too large to pass through flow channel 100 accumulate at collection edge 80 as the medium being filtered passes from inlet opening 20a to outlet opening 20b.

The bars 90a and 90b and flow channel 100 may be formed by removing disc material through a chemical or mechanical etching process, the bars 90a and 90b constituting the material left behind by the etching process. The flow channel 100 may be created according to various patterns known in the art, including the pattern described in U.S. Pat. No. 5,711,877, the disclosure of which is incorporated herein by reference. Depending on the etch pattern, a filtering arm 10a may achieve filtration ratings of 15 μm or less.

Although the bars 90a and 90b and flow channel 100 are shown as parallel to each other and substantially perpendicular to the filtering arm 10a, it will be understood by a person of ordinary skill in the art that, in alternative embodiments of the invention, the etched pattern may include bars which are not parallel to each other and/or bars and flow channels that are not substantially perpendicular to the filtering arm. The etched pattern of bars and flow channels may be chosen to suit the medium being filtered, the contaminant being removed or separated, the desired filtering or flow rate, other desired flow characteristics such as flow pressure at various points in the flow path, ease of construction or other considerations. Furthermore, bars 90a and 90b may extend from the collection edge 80 to the opposing edge 70. However, as shown in FIG. 1A, bars 90a and 90b may not extend completely from collection edge 80 to opposing edge 70 to achieve desired flow characteristics at the inlet or outlet of the flow channel 100 or for structural or other reasons. Bars 90a and 90b and flow channel 100 may be on either the top face or the bottom face of the disc or both.

FIG. 1B shows an enlarged cross-section of a disc stack with aligned discs of the type shown in FIG. 1 wherein the view is taken along the line B—B running through the middle of the filtering arm 10b (and the corresponding filtering arms in the other discs of the stack). The dark regions represent bars 90 while the light regions represent flow channels 100. The discs in a stack may be compressed together so that no gaps between the bottom face of one disc and the adjoining top face of the next disc in the stack are larger than the flow channels 100. Since high disc stack compression loads are generally required to obtain acceptable disc-to-disc seals, the material of the discs is normally a soft metal such as copper, aluminum or a nickel alloy. Soft metals create better seals between adjacent discs. However, other materials may be used for the discs such as titanium, stainless steels, and plastic or other non-metal materials. The material chosen may depend on, among other things, the media being filtered or the contaminant being removed or separated.

The discs in a disc stack may be aligned by any of several methods. An indexing feature, such as a central hexagonal or polygonal hole or an indexing tab or notch may be etched on either the top or bottom surface of each disc. Stacking tools may be used to bring the indexing features in each disc into alignment.

FIG. 2 shows a bodiless filter element in accordance with the invention. Multiple circular etched discs with radial filtering arms, as shown in FIG. 1, may be stacked together to form the bodiless filter element. The discs in FIG. 1 may be joined together by mechanical fasteners, by welding, by diffusion bonding, or by other joining methods. One example of a mechanical fastening technique is the use of a hex nut and shaft configuration wherein the shaft runs through the centers 40 of the individual discs in the stack. The shaft may include a protrusion that corresponds to a notched hole in the center 40 of the etched discs to aid in the alignment process: The joining method chosen may depend upon the disc material, the medium being filtered or the contaminant being removed or separated. For example, the use of particular adhesives for joining may be inappropriate if the filter element is being used in conjunction with acidic media.

When bonding, fastening, welding or otherwise joining discs that are substantially identical in size, the openings 20a–10h and/or filtering arms 10a–10h may be aligned. Inlet end plate 60 and outlet end plate 61 may determine which openings 20a–10h in the individual discs are inlet openings 20a, 20c, 20e and 20g and which are outlet openings 20b, 20d, 20f and 20h. When the discs are stacked together, the inlet openings 20a, 20c, 20e and 20g of the individual discs may be combined to form inlet passages 21a, 21c, 21e and 21g. Similarly, the outlet openings 20b, 20d, 20f and 20h may be combined to form outlet passages 21b, 21d, 21f and 21h (demarcated by hidden lines since these passages are obscured from view by the inlet end plate). Inlet end plate 60 is attached to the inlet end of the filter element and may include openings corresponding to each of the inlet passages 21a, 21c, 21e and 21g. The inlet end plate 60 may block unfiltered medium from entering outlet passages 21b, 21d, 21f and 21h, since inlet end plate 60 does not have openings corresponding to those passages. Conversely, outlet end plate 61 on the outlet end of the filter element includes openings corresponding to outlet passages 21b, 21d, 21f and 21h but no openings corresponding to inlet flow passages 21a, 21c, 21e and 21g. This configuration of inlet end plate 60 and outlet endplate 61 may force media to flow from the inlet passages 21a, 21c, 21e and 21g, across the radial arms 10 and into the outlet openings 21b, 21d, 21f and 21h.

The overall differential pressure of the filter element will determine, in part, how thick inlet and outlet end plates 60 and 61 must be. To determine the filtration rating of a filter assembly in accordance with the present invention, bubble and/or boil point pressure tests known in the art may be used. These functional tests can be used to verify that the absolute and nominal filtration rating, respectively, of the element meet the required specifications. In embodiments of the present invention in which the filter element has an equal number of inlet and outlet passages and/or the combined cross-sectional area of the inlet passages equals that of the outlet passages, media may flow through the filter element equally in either direction. The filtering arm etched discs of FIG. 1 may be diffusion bonded either individually or using a fret method (in which multiple discs are etched upon a sheet of material and the sheets are stacked before the stacks are cut to form multiple filter elements) to form the disc stack filter elements. The exterior borders 50 of the bonded radial arm etched discs of the type shown in FIG. 1 may form the structural body 71 of the filter element when the discs are stacked together. A portion of the structural body 71 is cut away in FIG. 2 to show the stacked disc filtering arms 10 in the interior of the filter element. The structural body 71 formed by the exterior borders 50 of the discs supports and protects the interior of the filter element within a filter assembly as shown in FIG. 3. The structural body 71 may form a barrier between the interior of the filter element 21 and the exterior of the filter element that is impermeable to the medium or the contaminant.

In other embodiments, the filter element may be encased within an outer tube. FIG. 3 displays an embodiment of a filter assembly according to the present invention that incorporates an outer body tube 150. The outer body tube 150 may support a filter element 120 connected to an inlet port 130 and an outlet port 140. The inlet port wall 131 and outlet port wall 141 may be welded to either end of the filter element 120 at welds 160 and 161. The body tube 150 may consist of tubing of standard wall thickness determined by the pressure needed for the application and the thickness of the exterior border 50 of the disc in the filter element stack. To seal the filter element to the inlet port 130 and outlet port 140, thus creating a filter assembly, the welds 160 and 161 may penetrate the filter element contained within the outer body tube 150.

Figure 4:
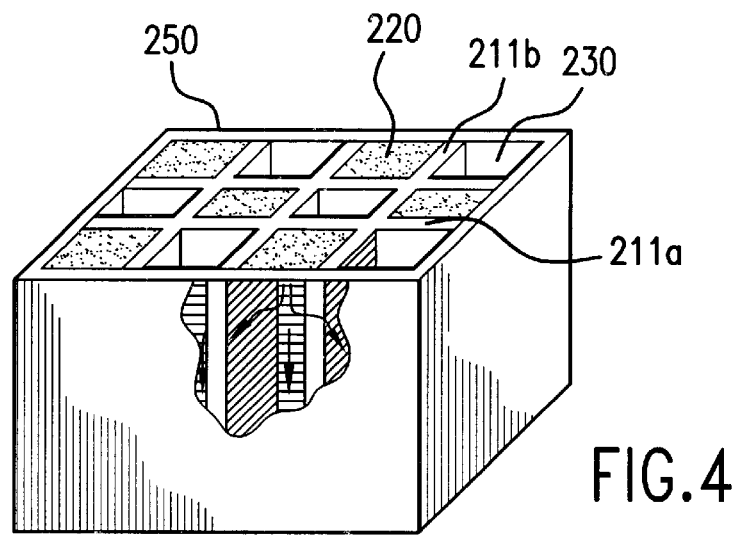
FIG. 4 is a fragmentary perspective view of an alternative, rectangular shaped, disc stack provided in accordance with an embodiment of the present invention.

An exemplary rectangular shaped, disc stack filter element according to the present invention is shown in FIG. 4.

While round and rectangular shaped discs have been specifically disclosed herein as models, it will be understood by a person of ordinary skill in the art that many different shapes of discs may be used. In the rectangular shaped disc stack, the filtering arms 211a and 211b extend from one side of the exterior border 250 to the opposite side of the exterior border 250. The filtering arms 211a and 211b extend both horizontally (211a) and/or vertically (211b) and may create a checkered pattern. As with the circular disc stack embodiment, the stacked rectangular discs may be aligned so that the inlet openings of the discs form inlet passages 220 and the outlet openings of the discs form outlet passages 230. The number of inlet passages 220 and outlet passages 230 may be equal in number and total area as in the circular disc configuration shown in FIGS. 1 and 2.

Figure 4A:
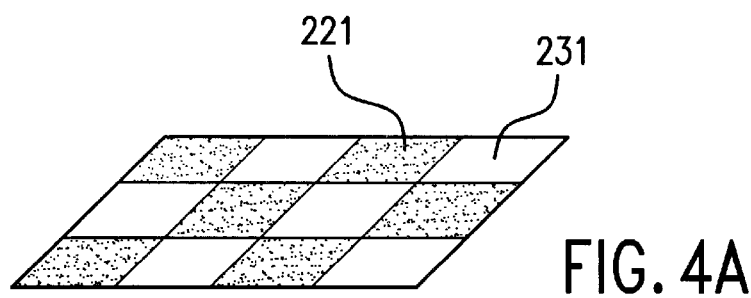
FIG. 4A is a fragmentary perspective view of an alternative, rectangular shaped, end plate provided in accordance with an embodiment of the present invention.

A rectangular end plate, as shown in FIG. 4A, may determine which of the passages in the disc stack are inlet passages 220 and which are outlet passages 230 in this embodiment of the invention. If an inlet end plate is attached to the inlet end of the rectangular filter element, the open areas 221 may define the inlet passages 220 and the closed areas 231 may define the outlet passages 231. Conversely, if the end plate 60 is sealed on the outlet end of the rectangular filter element, the open areas 221 may define the outlet passages 230 and the closed areas 231 may define the inlet passages 220. The rectangular shaped discs may be diffusion bonded, welded, mechanically fastened, or otherwise joined together. As in the circular disc embodiment shown in FIGS. 1 and 2, the flow of media is directed by the end plates to enter the inlet passages 220, flow across the filtering arms 211a and 211b, and exit through the outlet flow passages 230.

Figure 5:
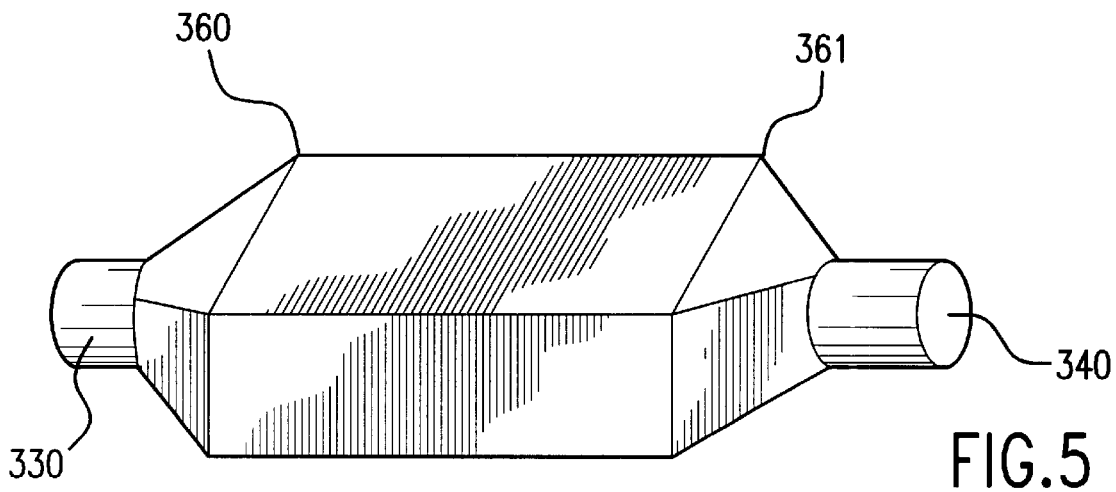
FIG. 5 is a perspective view of an exemplary rectangular disc stack filter assembly provided in accordance with an embodiment of the present invention.

FIG. 5 shows an exemplary embodiment of a rectangular shaped filter assembly. The rectangular filter element of FIG. 4 may be incorporated into the filter assembly. Inlet port 330 and outlet port 340 may be attached to the filter element by welding or other appropriate means. Inlet port 330 and outlet port 340 may specifically be attached to inlet end cap 360 and outlet end cap 361 respectively.

While the description above refers to particular embodiments of the present invention, it should be readily apparent to people of ordinary skill in the art that a number of modifications may be made without departing from the spirit thereof. The accompanying claims are intended to cover such modifications as would fall within the true spirit and scope of the invention. The presently disclosed embodiments are, therefore, to be considered in all respects as illustrative and not restrictive, the scope of the invention being indicated by the appended claims rather than the foregoing description. All changes that come within the meaning of and range of equivalency of the claims are intended to be embraced therein.

What is claimed is:

1. A filter element comprising:
   a plurality of discs, each disc having an exterior border, a filtering arm and a plurality of disc openings, each of said disc openings being enclosed by at least one of said filtering arm and said exterior border, wherein
   said discs are joined together to form a disc stack,
   said filtering arm has a top face and a bottom face,
   said disc openings of each disc are aligned so as to define passages, and
   on at least one of said discs, said filtering arm has material removed from at least one of said top face and said bottom face to form at least one flow channel between at least two bars of unremoved material.

2. The filter element according to claim 1, wherein said exterior borders are bonded together to form a structural body.

3. A filter element according to claim 1, wherein said disc stack has an inlet end and said passages include an inlet passage and further comprising an inlet end plate attached to the inlet end of said disc stack, said inlet end plate having at least one end plate opening corresponding to said inlet passage.

4. A filter element according to claim 1, wherein said disc stack has an outlet end and said passages include an outlet passage and further comprising an outlet end plate attached to the outlet end of said disc stack, said outlet end plate having at least one end plate opening corresponding to said outlet passage.

5. A filter element according to claim 1, wherein
said discs are circular and have a center, and
said filtering arm extends radially from said center to said exterior border.

6. A filter element according to claim 1, wherein
said discs are rectangular,
said exterior border has a first side and an opposing second side, and
said filtering arm extends from said first side to said second side.

7. A filter element according to claim 1, wherein
said disc openings include at least one inlet opening and at least one outlet opening,
said passages include an inlet passage and an outlet passage,
there are equal numbers of said at least one inlet opening and said at least one outlet opening, and
the total cross-sectional area of said at least one inlet opening equals the total cross-sectional area of said at least one outlet opening.

8. A filter element according to claim 1, wherein material is removed from said filtering arm by chemical etching.

9. A filter element according to claim 1, wherein material is removed from said filtering arm by mechanical etching.

10. A filter element according to claim 1, wherein said discs are diffusion bonded together.

11. A filter element according to claim 1, wherein said discs are mechanically fastened together.

12. A filter element according to claim 11, wherein said discs are mechanically fastened together using a hex shaft and nut configuration.

13. The filter element of claim 11, further including a mechanical fastener, and wherein each of said discs is circular and has a center, and further wherein said mechanical fastener run through said centers of said plurality of discs.

14. A filter element according to claim 1, wherein
said passages include an inlet passage and an outlet passage,
said filtering arm has a collection edge proximate said inlet passage and a second edge proximate said outlet passage, and
said bars extend from said collection edge to said second edge.

15. A filter element according to claim 1, wherein said bars and said flow channel are substantially parallel.

16. The filter element of claim 1, wherein said filter element is used to remove a contaminant from a medium, and further wherein said discs are joined together such that said exterior borders of said discs in said disc stack form a structural body that separates an exterior of said filter element from an interior of said filter element and that is impermeable to said medium or said contaminant.

17. A filter assembly comprising:
a plurality of discs, each disc having an exterior border, a filtering arm and a plurality of disc openings, each of said disc openings being enclosed by at least one of said filtering arm and said exterior border; and
an outer tubing encasing the disc stack, wherein
said discs are joined together to form a disc stack,
said filtering arm has a top face and a bottom face,
said disc openings of each disc are aligned so as to define passages, and
on at least one of said discs, said filtering arm has material removed from at least one of said top face and said bottom face to form at least one flow channel between at least two bars of unremoved material.

18. A filter assembly according to claim 17, further comprising an inlet port.

19. A filter assembly according to claim 17, further comprising and an outlet port.

20. A filter assembly according to claim 17, further comprising an inlet end plate.

21. A filter assembly according to claim 20, further comprising an inlet port, said inlet port welded to said inlet end plate.

22. A filter assembly according to claim 17, further comprising an outlet end plate.

23. A filter assembly according to claim 22, further comprising an outlet port, said outlet port welded to said inlet end plate.

24. A filter element comprising:
a plurality of circular discs, each disc having a center, an exterior border, at least one radial filtering arm extending substantially from said center to said exterior border and a plurality of disc openings, each of said disc openings being enclosed by the combination of said at least one radial filtering arm and said exterior border, wherein
said discs are joined together to form a disc stack,
said disc openings of each disc are aligned such that the plurality of disc openings define at least one inlet passage and at least one outlet passage and said exterior borders define a structural body, and
on at least one of said discs, said filtering arm has material removed from a face of said filtering arm to form at least one flow channel between at least two bars of unremoved material.

25. The filter element of claim 24, wherein said flow channel extends from said inlet passage and said outlet passage.

26. The filter element of claim 24, wherein a mechanical fastener runs through said centers of said plurality of discs.

27. The filter element of claim 24, wherein said filter element is used to remove a contaminant from a medium, and further wherein said structural body separates an exterior of said filter element from an interior of said filter element, and further wherein said structural body is impermeable to said medium or said contaminant.

28. A filter element according to claim 24, wherein the total cross-sectional area of said at least one inlet passage equals the total cross-sectional area of said at least one outlet passage.

* * * * *